: 2,723,245
Patented Nov. 8, 1955

2,723,245

METHOD OF REGENERATING QUATERNARY AMMONIUM ANION EXCHANGE RESINS

Robert M. Wheaton, Midland, Mich., assignor to The Dow Chemical Company, Midland, Mich., a corporation of Delaware No Drawing. Application December 30, 1952,
Serial No. 328,793

6 Claims. (Cl. 260—2.1)

This invention concerns an improved process for regenerating a strongly basic quaternary ammonium anion exchange resin to its hydroxide form.

Strongly basic quaternary ammonium anion exchange resins and methods of making the same are well known. Bauman et al. in U. S. Patent No. 2,614,099 and McBurney in U. S. Patent No. 2,591,573, describe insoluble resinous quaternary ammonium compositions suitable for the removal of anions from fluids and a method of making the same. In brief, a strongly basic quaternary ammonium anion exchange resin is prepared by reacting a tertiary amine with an insoluble cross-linked copolymer of a predominant amount of a monovinyl aromatic hydrocarbon and a minor proportion of a divinyl aromatic hydrocarbon such as a copolymer of styrene and divinylbenzene, or a copolymer of styrene, ethylvinylbenzene and divinylbenzene, which copolymer contains on its aromatic nuclei substituent halomethyl groups, e. g. chloromethyl or bromomethyl groups, whereby an insoluble resinous quaternary ammonium base or a salt thereof is obtained. Other anion exchange resins of the strongly basic quaternary ammonium type are described in U. S. Patents Nos. 2,597,440 and 2,597,494. Such anion exchange resins comprise the reaction product of a tertiary amine and a haloalkylated insoluble copolymer of one or more vinyl aromatic compounds such as styrene or vinylanisole and a minor proportion of a polyolefinic compound, e. g. divinylbenzene, isoprene, butadiene, trivinylbenzene, etc., with one another to form a product containing on the aromatic nuclei substituent groups having the general formula:

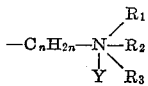

in which $n$ is an integer having a value of from 1 to 4, $R_1$, $R_2$ and $R_3$ represent monovalent organic radicals, and $Y$ is an anion. The strongly basic quaternary ammonium anion exchange resins are prepared by haloalkylating, preferably chloromethylating, an insoluble vinyl aromatic resin and then reacting the haloalkylated product with a tertiary amine such as trimethylamine, triethylamine, dimethylbenzylamine, dimethylethanolamine, or dimethylaniline. Other tertiary amines, such as tributylamine, N-methylmorpholine and pyridine, are also operable, but the products are somewhat less stable than those made with the tertiary amines first mentioned.

The strongly basic quaternary ammonium anion exchange resins in their hydroxide form are extremely strong bases which neutralize acids, split salts and exchange ions in neutral to alkaline aqueous solutions. Thus, when a solution of sodium chloride is passed through a column containing a quarternary ammonium anion exchange resin in its hydroxide form, the chloride ions of the salt solution are exchanged for the hydroxyl groups on the resin and the liquid leaves the column as a solution of sodium hydroxide. The resin may be regenerated to its hydroxide form by washing with a solution of a strong base such as sodium hydroxide. The resins have such physical characteristics as to be capable of repeated use and regeneration in conventional water-treating equipment.

It has been observed, on repeated cycles of use and regeneration of the quaternary ammonium anion exchange resins for treating water, that the operating capacity of the resin, i. e. the effective capacity of a bed of the resin for removal of anions before breakthrough of the undesirable ions occurs in the effluent water, is substantially lower than the total anion exchange capacity of the resin. It has also been noted that the strongly basic quaternary ammonium anion exchange resins in their hydroxide form, more particularly such resins containing on the aromatic nuclei, substituent groups having the aforementioned general formula wherein $R_1$, $R_2$ and $R_3$ represent monovalent hydrocarbon radicals, have a tendency to preferentially absorb certain monovalent anions such as chloride, bromide, or nitrate, ions from an aqueous solution. This characteristic of the resins is of advantage when employing the resins for the removal of such ions from a fluid, but is disadvantageous when regenerating the resins to the hydroxide form. Although the strongly basic quaternary ammonium anion exchange resins, in the form of salts containing monovalent ions, such as chloride or bromide ions, attached to the nitrogen atoms of the quaternary ammonium groups, can be regenerated to the hydroxide form by washing with an aqueous solution of a strong base, e. g. an aqueous solution of sodium hydroxide, such regeneration usually requires prolonged washing of the resin with the alkali solution or the employment of an undesirably large proportion of the alkali.

It has now been found that a strongly basic quaternary ammonium anion exchange resin in its salt form, containing monovalent ions attached to the nitrogen atoms in the quaternary ammonium groups, can readily be regenerated to its hydroxide form by contacting such salt of the resin with an aqueous solution of an inorganic compound providing polyvalent anions to the solution, whereby the monovalent anions are displaced from the resin by the polyvalent anions, and then treating the anion exchange resin with an aqueous solution of a strong base, e. g. sodium hydroxide.

It has further been found that by first treating an at least partly exhausted bed of a strongly basic quaternary ammonium anion exchange resin in its salt form and containing monovalent ions attached to the quaternary ammonium groups with an aqueous solution of an inorganic compound, such as sodium sulfate, sodium carbonate, sodium phosphate, or sulfuric acid, providing polyvalent anions to the solution, so as to replace the monovalent ions on the resin with polyvalent ions from the solution, that the anion exchange resin can thereafter readily, rapidly and efficiently be regenerated to its hydroxide form by washing the resin with an aqueous solution of a strong base, e. g. an aqueous solution containing at least 4 per cent by weight or more of sodium hydroxide.

It is important that the aqueous solution of the inorganic compound, providing polyvalent anions to the solution, contain the solute in high dilution, i. e. in concentration not exceeding an aqueous 0.5-normal solution, in order that the monovalent ions absorbed on the anion exchange resin can readily and efficiently be replaced by polyvalent anions from the solution. The polyvalent ions are in turn readily, rapidly and efficiently displaced from the anion exchange resin by washing the resin with an aqueous solution of an alkali metal hydroxide, e. g. an aqueous solution containing 4 per cent by weight or more of sodium hydroxide.

The inorganic compound to be employed in the process for providing polyvalent anions should be a substance, e. g. an acid or a salt, which readily ionizes in dilute aqueous solutions. Examples of such ionizable substances are sodium sulfate, sodium carbonate, potassium sulfate, potassium carbonate, sodium phosphate, sodium bisulfate, sodium bicarbonate, monobasic sodium phosphate, dibasic sodium phosphate, or tetrasodium pyrophosphate, or sulfuric acid or phosphoric acid. Other inorganic compounds which are operable are magnesium sulfate, calcium sulfate, ferrous sulfate, and zinc sulfate. Any water-soluble inorganic compound which ionizes in a dilute aqueous solution to provide polyvalent anions, particularly sulfate, carbonate, or phosphate ions, and which compound does not form insoluble substances with the monovalent ions displaced from the anion exchange resin may be employed in the process. Sodium sulfate, sodium carbonate, sodium phosphate and sulfuric acid are the inorganic compounds preferably employed and are of most practical value. The inorganic compound is employed in high dilution, i. e. in concentration not exceeding a 0.5-normal aqueous solution, preferably in concentration of from a 0.01 to 0.2-normal solution. The proportion of the inorganic compound providing polyvalent anions to the aqueous solution employed in the process is usually an amount such that the anion exchange resin in its salt form and containing monovalent ions, e. g. chloride ions, attached to the quaternary ammonium groups is substantially regenerated or is at least 80 per cent or more converted to the polyvalent salt form, prior to treating the resin with an aqueous solution of an alkali metal hydroxide to convert the anion exchange resin to its hydroxide form. The inorganic compound providing polyvalent anions to the solution is usually employed in amount corresponding to from 1 to 4 times the chemically equivalent capacity of the anion exchange resin.

The process is usually carried out by contacting the exhausted, or at least partly exhausted, strongly basic quaternary ammonium anion exchange resin in its salt form and containing monovalent ions such as chloride, bromide, or nitrate, ions attached to the nitrogen atoms of the quaternary ammonium groups, with a dilute aqueous solution of an inorganic compound, e. g. sodium sulfate, sodium carbonate, or sulfuric acid, by flowing the solution through a bed of the resin. The solution is usually fed to the bed at a rate corresponding to from 1 to 5 gallons or more of the solution per minute per square foot of cross section of the resin bed, and in a proportion containing the ionizable solute in amount at least as great as the chemical equivalent of the anion exchange capacity of the resin, suitably in amount corresponding to from 4 to 8 pounds of the inorganic compound per cubic foot of a bed of the resin. The resin is usually rinsed or washed with water. An aqueous solution of an alkali metal hydroxide, preferably sodium hydroxide, in concentration of at least 4 per cent by weight, i. e. a one-normal solution, is then passed through the bed of resin, suitably at a rate corresponding to from 0.5 to 5 gallons of the alkali solution per square foot of cross section of the bed, to regenerate the anion exchange resin to its hydroxide form, after which the resin is washed with water to remove the excess sodium hydroxide. The alkali metal hydroxide is used in concentration corresponding to at least a one-normal aqueous solution, preferably an aqueous solution of from one to five normal, i. e. in concentration of from 4 to 20 per cent by weight of the solution.

When using the above procedure of the invention, it has been found that a strongly basic quaternary ammonium anion exchange resin in its salt form, e. g. its chloride form, can be regenerated to its hydroxide form with from 1 to 4 gram molecular equivalents of sodium hydroxide per gram atomic weight of chloride ions absorbed by the resin. The invention provides an improved procedure for regenerating to its hydroxide form, an exhausted, or an at least partially exhausted, strongly basic quaternary ammonium anion exchange resin in its salt form and containing monovalent ions attached to the quaternary ammonium groups, which method results in the obtainance of a good operating capacity for the resin, together with a high efficiency for regeneration of the anion exchange resin to its hydroxide form, based on the amount of alkali metal hydroxide used.

The following examples illustrate ways in which the principle of the invention has been applied, but are not to be construed as limiting the invention.

EXAMPLE 1

A charge of 464 cubic centimeters of a batch of a granular strongly basic quaternary ammonium anion exchange resin in its chloride form was placed in a glass tube of one inch internal diameter to form a bed of the resin approximately three feet deep. The anion exchange resin was the reaction product of trimethylamine and an insoluble cross-linked chloromethylated copolymer of approximately 88 per cent by weight styrene, 4.5 per cent ethylvinylbenzene and 7.5 per cent divinylbenzene. The resin contained substituent groups having the formula:

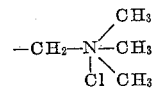

attached to aromatic nuclei in the copolymer. The anion exchange resin was in the form of rounded beads of a size such as to pass through a 20 mesh per inch standard Tyler screen and be retained on a 50 mesh per inch screen. The resin had an anion exchange capacity of 1.08 milliequivalents per cubic centimeter of a bed of the resin, corresponding to an anion exchange capacity of 23,800 grains of calcium carbonate per cubic foot of a bed of the resin. The bed of the resin had an anion exchange capacity of 502 milliequivalents. The column was filled with water to the top level of the resin bed. Thereafter, 4450 cc. of an aqueous solution containing one per cent by weight of sulfuric acid was fed to the column at a rate of 100 cc. of the solution per minute and passed downflow through the bed of the resin. This was followed by feed of 370 grams of an aqueous solution containing 12 per cent by weight of sodium hydroxide to the bed of resin at a rate of 20 cc. of the solution per minute, after which the resin was washed with distilled water to remove the excess sodium hydroxide. The operating capacity for the bed of the anion exchange resin, regenerated to its hydroxide form, was determined by feeding an aqueous solution containing 365 parts by weight of hydrochloric acid per million parts of the solution, i. e., a 0.01-normal solution of hydrochloric acid, to the column at a rate of 100 cc. of the solution per minute and passing the solution downflow through the bed of the resin. The effluent water was analyzed for hydrochloric acid. Feed of the hydrochloric acid solution was stopped when the effluent water contained 5 parts of HCl per million parts of the water, i. e. when breakthrough of the hydrochloric acid occurred. The operating capacity for the anion exchange resin was calculated from the amount of the hydrochloric acid consumed. The resin had an operating anion exchange capacity corresponding to 15,150 grains of calcium carbonate per cubic foot of a bed of the resin. The operating capacity of the bed of the anion exchange resin was 63.7 per cent of its total anion exchange capacity.

For purpose of comparison, 370 grams of an aqueous solution containing 12 per cent by weight of sodium hydroxide was fed to the column at a rate of 20 cc. of the solution per minute and passed downflow through the bed of the anion exchange resin in its chloride form, after which the resin was washed with distilled water. The operating capacity for the resin was determined as just described. The resin had an operating capacity corresponding to only 11,150 grains of calcium carbonate per cubic foot of a bed of the resin. The operating capacity of the bed of the resin was only 46.8 per cent of the total anion exchange capacity of the resin.

EXAMPLE 2

In each of a series of experiments, 464 cc. of a granular strongly basic quaternary ammonium anion exchange resin composed of the reaction product of a tertiary amine, as stated in the following table, and a chloromethylated copolymer of approximately 88 per cent styrene, 4.5 per cent ethylvinylbenzene and 7.5 per cent divinylbenzene was placed in a one inch internal diameter glass tube to form a bed of the resin 36 inches deep. The anion exchange resins were in the form of rounded granules of from 20 to 50 mesh per inch size as determined by standard Tyler screens. Each bed of anion exchange resin was treated with a dilute aqueous solution of hydrochloric acid to convert the resin to its chloride form and was washed with water. Thereafter, 4450 cc. of an aqueous solution containing one per cent by weight of sodium sulfate was fed to the column at a rate of 100 cc. of the solution per minute and passed downflow through the bed of the resin. It was followed by 370 cc. of an aqueous solution containing 12 per cent by weight of sodium hydroxide which was fed to the bed at a rate of 20 cc. of the alkali solution per minute. The bed of the anion exchange resin was washed with distilled water to remove the excess sodium hydroxide. The operating capacity for the resin was determined by flowing an aqueous 0.01-normal solution of hydrochloric acid down through the bed of the resin at a rate corresponding to a feed to the column of 100 cc. of the acid solution per minute. Feed of the hydrochloric acid solution was stopped when the effluent water contained 5 parts of HCl per million parts of the water. The operating capacity for the resin was calculated from the amount of the HCl absorbed by the resin before breakthrough occurred. For purpose of comparison each bed of quaternary ammonium anion exchange resin in its chloride form was contacted with 370 grams of an aqueous solution containing 12 per cent by weight of sodium hydroxide by feeding the solution to the column at a rate of 20 cc. per minute and passing the solution downflow through the bed of resin, after which the resin was washed with water. The operating capacity for the thus-regenerated bed of the resin was determined as just described. Table I identifies each quaternary ammonium anion exchange resin by naming the tertiary amine reactant employed in preparing the same, and gives the anion exchange capacity for the resin as grains of calcium carbonate per cubic foot of a bed of the resin. The table also gives the weight in grams of sodium sulfate and sodium hydroxide employed in regenerating the resin to its hydroxide form, the operating capacity for the bed of the regenerated resin, and the per cent regeneration.

*Table*

| Run No. | Anion Exchange Resin | | | | | |
|---|---|---|---|---|---|---|
| | Tertiary Amine | Capacity gr. CaCO₃ cu. ft. | Na₂SO₄, gms. | NaOH, gms. | Operating Capacity gr. CaCO₃ cu. ft. | Percent Regeneration |
| 1 | Dimethylbenzylamine | 25,900 | 44.5 | 44.4 | 12,800 | 49.5 |
| 2 | ----do---- | 25,900 | 0 | 44.4 | 5,400 | 20.8 |
| 3 | Triethylamine | 20,400 | 44.5 | 44.4 | 14,350 | 70.2 |
| 4 | ----do---- | 20,400 | 0 | 44.4 | 8,650 | 42.4 |
| 5 | Dimethylaniline | 18,500 | 44.5 | 44.4 | 8,800 | 47.5 |
| 6 | ----do---- | 18,500 | 0 | 44.4 | 5,700 | 30.8 |
| 7 | N-methylmorpholine | 24,100 | 44.5 | 44.4 | 15,500 | 64.3 |
| 8 | ----do---- | 24,100 | 0 | 44.4 | 7,050 | 29.3 |
| 9 | Pyridine | 24,000 | 44.5 | 44.4 | 9,600 | 40.3 |
| 10 | ----do---- | 24,000 | 0 | 44.4 | 5,600 | 23.3 |

As shown in the above table, the anion exchange resins have a substantially higher operating capacity when regenerated to their hydroxide form by the method described herein than when the anion exchange resins in their chloride form are treated directly with an aqueous solution of sodium hydroxide in similar amount.

EXAMPLE 3

A granular quaternary ammonium anion exchange resin consisting of the reaction product of dimethylethanolamine and a chloromethylated copolymer of approximately 88 per cent styrene, 4.5 per cent ethylvinylbenzene and 7.5 per cent divinylbenzene was placed in a one inch internal diameter glass tube to form a bed of the resin 36 inches deep. The resin was in the form of rounded granules of sizes such as to pass through a 20 mesh per inch standard Tyler screen and be retained on a 50 mesh screen. The resin was in its chloride form and had an anion exchange capacity corresponding to 25,000 grains of calcium carbonate per cubic foot of a bed of the resin. The column was filled with distilled water to the top level of the resin bed. A charge of 4450 cc. of an aqueous one per cent solution of sodium sulfate was fed to the column at a rate of 100 cc. of the solution per minute and passed downflow through the bed of resin, followed by 370 grams of an aqueous 12 per cent solution of sodium hydroxide fed to the bed at a rate of 20 cc. of the alkali solution per minute, after which the bed of resin was washed with water. The operating capacity for the resin was determined by procedure as described in Example 1. The anion exchange resin had an operating capacity corresponding to 20,100 grains of calcium carbonate per cubic foot of a bed of the resin. When the bed of the anion exchange resin in its chloride form is treated with 370 grams of an aqueous solution containing 12 per cent by weight of sodium hydroxide, then washed with water, the operating capacity is only 17,300 grains of calcium carbonate per cubic foot of a bed of the resin.

EXAMPLE 4

A granular anion exchange resin similar to that described in Example 1, except in its bromide form and having an anion exchange capacity corresponding to 26,600 grains of calcium carbonate per cubic foot of a bed of the resin, was placed in a one inch internal diameter glass tube to form a bed of the resin 36 inches deep. The column was filled with distilled water to the top level of the resin bed. Thereafter, 4450 cc. of an aqueous one per cent solution of sodium bisulfate was fed to the column at a rate of 100 cc. of the solution per minute and passed downflow through the bed of the resin. After feed of the sodium bisulfate solution to the bed, 370 grams of an aqueous 12 per cent solution of sodium hydroxide was fed into the column at a rate of 20 cc. of the solution per minute and passed downflow through the bed of the resin. Excess sodium hydroxide was washed from the resin with water. The operating capacity for the resin was determined by procedure as described in Example 1, except using an aqueous 0.01-normal solution of hydrobromic acid. The anion exchange resin had an operating capacity corresponding to 15,300 grains of calcium carbonate per cubic foot of a bed of the resin.

In contrast, when the anion exchange resin in its bromide form is regenerated by feeding 370 grams of an aqueous 12 per cent by weight solution of sodium hydroxide to the bed at a rate of 20 cc. of the solution per minute and the excess alkali is washed from the bed with water, the resin is found to have an operating capacity corresponding to only 6,350 grains of calcium carbonate per cubic foot of a bed of the resin.

EXAMPLE 5

A granular anion exchange resin similar to that described in Example 1, except in its nitrate form, was placed in a one inch internal diameter glass tube to form a bed of the resin 36 inches deep. The resin had an anion exchange capacity corresponding to 24,000 grains of calcium carbonate per cubic foot of a bed of the resin. The column was filled with water to the top level of the resin bed. Thereafter, 4450 cc. of an aqueous one per cent by weight solution of sodium ortho-phosphate was fed to the column at a rate of 100 cc. of the solution per minute, followed by 370 grams of an aqueous 12 per cent by weight solution of sodium hydroxide fed to the bed at a rate of 20 cc. of the alkali solution per minute, after which the bed of resin was washed with distilled water. The operating capacity for the resin was determined by procedure similar to that described in Example 1, except using an aqueous 0.01-normal solution of nitric acid. The anion exchange resin had an operating capacity corresponding to 12,700 grains of calcium carbonate per cubic foot of a bed of the resin. The anion exchange resin was 53 per cent regenerated to its hydroxide form.

In contrast, when the bed of the anion exchange resin in its nitrate form was regenerated by feeding 370 grams of an aqueous 12 per cent by weight solution of sodium hydroxide thereto at a rate of 20 cc. of the solution per minute and was washed with water to remove the excess sodium hydroxide, the anion exchange resin had an operating capacity corresponding to only 7,600 grains of calcium carbonate per cubic foot of a bed of the resin, i. e. it was only 31.7 per cent regenerated to its hydroxide form.

EXAMPLE 6

The bed of the anion exchange resin in its nitrate form, described in Example 5, was regenerated to its hydroxide form by feeding 4450 cc. of an aqueous one per cent by weight solution of sodium sulfate to the bed at a rate of 100 cc. of the solution per minute, followed by 370 grams of an aqueous 12 per cent solution of sodium hydroxide fed to the bed at a rate of 20 cc. of the solution per minute. The anion exchange resin had an operating capacity corresponding to 15,400 grains of calcium carbonate per cubic foot of a bed of the resin. The anion exchange resin was 64 per cent regenerated to its hydroxide form.

EXAMPLE 7

A charge of 464 cubic centimeters of a batch of a granular quaternary ammonium anion exchange resin composed of the reaction product of trimethylamine and a chloromethylated copolymer of approximately 88 per cent by weight styrene, 4.5 per cent ethylvinylbenzene and 7.5 per cent divinylbenzene, was placed in a one inch internal diameter glass tube to form a bed of the resin approximately three feet deep. The anion exchange resin was in the form of rounded granules of a size such as to pass through a 20 mesh per inch standard Tyler screen and be retained on a 50 mesh per inch screen. The resin had an anion exchange capacity of 1.108 milliequivalents per cubic centimeter of a bed of the resin, corresponding to an anion exchange capacity of 24,300 grains of calcium carbonate per cubic foot of a bed of the resin. The total anion exchange capacity of the bed of the resin was 514 milliequivalents. Ten liters of an aqueous 0.1-normal solution of sodium sulfate was flowed down through the bed of the resin at a rate corresponding to a feed of the solution to the column of 100 cc. per minute, after which the resin was washed with water. The effluent liquor was analyzed and found to contain chloride in amount corresponding to an anion exchange capacity of 22,800 grains of calcium carbonate per cubic foot of a bed of the resin. The bed of the resin was 94 per cent converted to its sulfate form. Thereafter, an aqueous one-normal solution of sodium hydroxide was flowed down through the bed of the resin at a rate corresponding to a feed of the alkali solution to the column of 20 cc. per minute. The effluent liquor was collected as successive fractions and analyzed for sodium hydroxide. The per cent regeneration of the anion exchange resin to its hydroxide form was calculated from the amount of the sodium hydroxide consumed in the reaction. After feed of 700 cc. of the one-normal sodium hydroxide solution to the bed, the resin was 60 per cent regenerated to its hydroxide form. After feed of 1000 cc. of the alkali solution to the bed, the resin was 68.9 per cent regenerated to its hydroxide form.

EXAMPLE 8

The bed of the anion exchange resin in its chloride form described in Example 7, was regenerated to its hydroxide form by flowing two liters of an aqueous 0.145-normal solution of sodium sulfate down through the resin bed at a rate corresponding to a feed of 100 cc. of the solution per minute to the column, washing the resin with water, then feeding an aqueous 3-normal sodium hydroxide solution to the column at a rate of 20 cc. of the alkali solution per minute. The per cent regeneration of the resin was calculated from the amount of the sodium hydroxide consumed. After feed of 650 cc. of the 3-normal alkali solution to the bed, the anion exchange resin was 77.4 per cent regenerated to its hydroxide form. After feed of 800 cc. of the alkali solution to the bed, the resin was 88 per cent regenerated to its hydroxide form.

In contrast, when the anion exchange resin in its chloride form is regenerated by flowing 650 cc. of an aqueous 3-normal sodium hydroxide solution down through the bed at a rate corresponding to a feed of 20 cc. of the alkali solution per minute to the column, the anion exchange resin is only 43 per cent regenerated to its hydroxide form. After feed of 1140 cc. of the alkali solution to the bed the anion exchange resin is only 49.5 per cent regenerated to its hydroxide form.

EXAMPLE 9

Twenty-two liters of an aqueous 0.05-normal sodium carbonate solution was flowed down through the bed of the anion exchange resin in its chloride form which is described in Example 7. The sodium carbonate solution was fed to the bed at a rate of 100 cc. of the solution per minute. The bed was washed with water. The effluent was analyzed and found to contain chloride in amount corresponding to an anion exchange capacity of 21,950 grains of calcium carbonate per cubic foot of a bed of the resin. The anion exchange resin was 90 per cent converted to its carbonate form. Thereafter, an aqueous 1-normal solution of sodium hydroxide was flowed down through the bed of the resin at a rate corresponding to a feed of the solution to the column of 20 cc. per minute. The effluent was analyzed for sodium hydroxide. The per cent regeneration of the anion exchange resin to its hydroxide form was calculated from the amount of the sodium hydroxide consumed. After feed of 850 cc. of the 1-normal sodium hydroxide solution to the bed, the resin was 62 per cent regenerated to its hydroxide form. After feed of 1100 cc. of the alkali solution to the bed, the resin was 70 per cent regenerated to its hydroxide form.

I claim:

1. In a process for regenerating a strongly basic quaternary ammonium anion exchange resin comprising the reaction product of an insoluble cross-linked vinyl aromatic resin containing haloalkyl radicals on the aromatic nuclei and a tertiary amine, from a salt of the same having monovalent anions attached to the nitrogen atoms of the quaternary ammonium groups, the steps of first contacting a bed of the resin comprising such resin salt with an aqueous solution of an ionizable inorganic compound selected from the group consisting of the carbonates, phosphates and sulfates of an alkali metal, which aqueous solution contains the inorganic compound in a concentration not exceeding 0.5-normal, whereby monovalent anions attached to nitrogen atoms of the resin are displaced by polyvalent anions from the solution, and thereafter contacting the resin with an at least 1-normal aqueous solution of an alkali metal hydroxide, whereby polyvalent anions attached to nitrogen atoms of the resin are displaced by hydroxyl ions.

2. A process as described in claim 1, wherein the strongly basic quaternary ammonium anion exchange resin is the reaction product of a tertiary amine and a haloalkylated insoluble cross linked copolymer of a predominant amount of a monovinyl aromatic hydrocarbon and a minor proportion of a divinyl aromatic hydrocarbon, the said anion exchange resin containing on the aromatic nuclei substituent groups having the general formula:

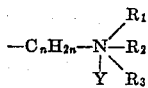

wherein $n$ is an integer having a value of from 1 to 4, $R_1$, $R_2$ and $R_3$ represent monovalent hydrocarbon radicals and Y is an anion.

3. A process as described in claim 1, wherein the strongly basic anion exchange resin is the reaction product of a tertiary amine and a halomethylated insoluble cross-linked copolymer of a predominant amount of a monovinyl aromatic hydrocarbon and a minor proportion of a divinyl aromatic hydrocarbon the said anion exchange resin containing on the aromatic nuclei substituent groups having the general formula:

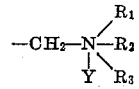

wherein $R_1$, $R_2$ and $R_3$ represent monovalent hydrocarbon radicals and Y is an anion.

4. A process as claimed in claim 1, wherein the strongly basic quaternary ammonium anion exchange resin contains chloride ions attached to the quaternary ammonium groups and the inorganic compound providing polyvalent anions to the solution in sodium sulfate.

5. A process as claimed in claim 1, wherein the strongly basic quaternary ammonium anion exchange resin contains chloride ions attached to the quaternary ammonium groups and the inorganic compound providing polyvalent anions to the solution is sodium carbonate.

6. A process as claimed in claim 1, wherein the strongly basic quaternary ammonium anion exchange resin contains chloride ions attached to the quaternary ammonium groups and the inorganic compound providing polyvalent anions to the solution is sodium phosphate.

References Cited in the file of this patent

UNITED STATES PATENTS

| | | |
|---|---|---|
| 2,451,272 | Blann | Oct. 12, 1948 |
| 2,482,765 | Haagensen | Sept. 27, 1949 |
| 2,591,573 | McBurney | Apr. 1, 1952 |

FOREIGN PATENTS

| | | |
|---|---|---|
| 654,706 | Great Britain | June 27, 1951 |

OTHER REFERENCES

Reents: Industrial and Engineering Chem., vol. 43, pages 730–733, March 1951 (No. 78).